US012459761B2

(12) United States Patent
Brown

(10) Patent No.: US 12,459,761 B2
(45) Date of Patent: Nov. 4, 2025

(54) SEALS FOR DOCK LEVELLING SYSTEMS, AND METHODS OF SEALING GAPS IN DOCK LEVELLING SYSTEMS

(71) Applicant: RENTOKIL INITIAL 1927 PLC, Camberley (GB)

(72) Inventor: Mark Brown, Prestatyn (GB)

(73) Assignee: Rentokil Initial 1927 PLC (GB)

( * ) Notice: Subject to any disclaimer, the term of this patent is extended or adjusted under 35 U.S.C. 154(b) by 756 days.

(21) Appl. No.: 17/796,089

(22) PCT Filed: Jan. 20, 2021

(86) PCT No.: PCT/GB2021/050118
§ 371 (c)(1),
(2) Date: Jul. 28, 2022

(87) PCT Pub. No.: WO2021/152290
PCT Pub. Date: Aug. 5, 2021

(65) Prior Publication Data
US 2023/0075989 A1  Mar. 9, 2023

(30) Foreign Application Priority Data

Jan. 29, 2020 (GB) .................................... 2001231

(51) Int. Cl.
*B65G 69/28* (2006.01)
*A01M 29/30* (2011.01)
*B65G 69/00* (2006.01)

(52) U.S. Cl.
CPC ......... *B65G 69/2876* (2013.01); *A01M 29/30* (2013.01); *B65G 69/008* (2013.01)

(58) Field of Classification Search
CPC ... B65G 69/008; B65G 69/2876; A01M 29/30
USPC ........................................ 14/69.5, 71.1, 71.3
See application file for complete search history.

(56) References Cited

U.S. PATENT DOCUMENTS

| 4,293,969 | A | * | 10/1981 | Frommelt | .......... | B65G 69/2876 |
| | | | | | | 114/263 |
| 5,396,676 | A | | 3/1995 | Alexander et al. | | |
| 5,398,632 | A | | 3/1995 | Goldbach et al. | | |
| 5,442,825 | A | | 8/1995 | Hahn et al. | | |
| 5,586,355 | A | * | 12/1996 | Metz | .................. | B65G 69/2882 |
| | | | | | | 14/71.3 |

(Continued)

FOREIGN PATENT DOCUMENTS

| CN | 1097392 A | 1/1995 |
| DE | 3937373 A1 | 5/1990 |

(Continued)

OTHER PUBLICATIONS

Great Britain Search Report for Great Britain Application No. GB2001231.6, dated Jun. 16, 2020, 4 pages.

(Continued)

*Primary Examiner* — Raymond W Addie
(74) *Attorney, Agent, or Firm* — Buchanan Ingersoll & Rooney PC

(57) ABSTRACT

A seal for a dock levelling system including a movable hinged ramp arranged within a recess. The seal is for sealing a horizontal gap between the hinged end of the movable ramp and a wall of the recess, and includes a rod and a tube of flexible material surrounding the rod.

15 Claims, 10 Drawing Sheets

(56) References Cited

U.S. PATENT DOCUMENTS

| | | |
|---|---|---|
| 6,360,393 B1 | 3/2002 | Fritz |
| 6,526,902 B1 | 3/2003 | Faber |
| 6,922,955 B2 * | 8/2005 | Sanders .................. E02D 27/32 |
| | | 14/71.3 |
| 2009/0126130 A1 * | 5/2009 | Bettendorf ......... B65G 69/2876 |
| | | 14/71.5 |
| 2009/0165224 A1 | 7/2009 | Digmann et al. |
| 2019/0337741 A1 | 11/2019 | Thole et al. |

FOREIGN PATENT DOCUMENTS

| | | |
|---|---|---|
| DE | 102012013559 A1 | 1/2014 |
| WO | 2014170289 A1 | 10/2014 |

OTHER PUBLICATIONS

International Preliminary Report on Patentability for International Application No. PCT/GB2021/050118, dated Jul. 28, 2022, 7 pages.
International Search Report and Written Opinion for International Application No. PCT/GB2021/050118, dated Apr. 23, 2021, 10 pages.
Chinese Office Action for Chinese Application No. 202180021381.X, dated Aug. 9, 2023 with English summary, 9 pages.

* cited by examiner

SEALS FOR DOCK LEVELLING SYSTEMS, AND METHODS OF SEALING GAPS IN DOCK LEVELLING SYSTEMS

CROSS REFERENCE TO RELATED APPLICATIONS

This application is a U.S. National Phase application of PCT International Application No. PCT/GB2021/050118, filed Jan. 20, 2021, which claims the benefit of GB Application No. 2001231.6, filed Jan. 29, 2020, both of which are incorporated by reference herein in their entireties for all purposes.

FIELD OF THE INVENTION

The present invention concerns seals for dock levelling systems, and methods of sealing gaps in dock levelling systems. More particularly, but not exclusively, the invention concerns seals for sealing gaps between levelers of dock levelling systems and the walls of the recesses in which they are mounted, to prevent the entry of unwanted pests such as rodents or the like

BACKGROUND OF THE INVENTION

A typical dock levelling system is described with reference to FIGS. 1 to 3. As shown in FIG. 1, the dock levelling system comprises a leveler 1 comprising a frame 2 on which is mounted a movable ramp 3. The ramp 3 has side panels 3a and 3b, and is hinged to the frame 2 at the rear 4 of the leveler 1. The ramp 3 can be moved up and down by a drive mechanism 5, which operates a piston 5a mounted to the frame 2 and the underneath of the ramp 3.

As shown in FIG. 2, the dock levelling system further comprises a recess 10 in a floor surface 13, the recess 10 having a rear wall 11 and side walls 12a and 12b.

FIG. 3 shows the dock levelling system 15 comprising the leveler 1 mounted within the recess 10. As can be seen, the leveler 1 effectively provides a portion of the floor surface 13 that can be moved up and down as required, and may for example be used as part of a loading bay for loading or unloading a heavy goods vehicle or the like.

It is a disadvantage of such dock levelling systems that there will be a gap between the rear 4 of the leveler 1 and the rear wall 11 of the recess 10. Such a gap can allow the entry of unwanted pests such as rodents or the like.

The present invention seeks to mitigate the above-mentioned problems. Alternatively and/or additionally, the present invention seeks to provide improved seals for dock levelling systems, and methods of sealing gaps in dock levelling systems.

SUMMARY OF THE INVENTION

In accordance with a first aspect of the invention there is provided a seal for a dock levelling system comprising a movable hinged ramp arranged within a recess, wherein the seal is for sealing a horizontal gap between the hinged end of the movable ramp and a wall of the recess, the seal comprising:
  a rod;
  a tube of flexible material surrounding the rod.

The tube of flexible material is able to fill the gap between the hinged end of the movable ramp and the wall of the recess, so sealing the gap and providing a barrier to rodents or the like. Further, the seal is held in place by friction between the tube of flexible material and the surfaces of the movable ramp and the wall of the recess. The rod within the tube of flexible material provides support and helps maintain the shape of the tube of flexible material, enabling it to maintain its shape when being positioned in the gap, ensuring that it seals the full horizontal length of the gap. The rod also helps the tube of flexible material exert sufficient force against the surfaces of the movable ramp and the wall of the recess for there to be sufficient friction to keep the seal in position.

The flexible material of the tube may be a wire mesh. Preferably, the flexible material is a metal wire mesh. This provides a suitably flexible and resilient material to form the seal, but also provides a good barrier against damage by rodents or the like, in particular by chewing. Alternatively, the flexible material may be textile, Kevlar, or another suitable material.

Advantageously, the rod comprises a plurality of rod sections connected by connectors. In this case, advantageously the outside surfaces of the rod sections comprise a thread, and are arranged to screw into threaded recesses in the connectors.

Preferably, the seal further comprises a bush on at least one end of the rod. Preferably, the seal comprises a bush on each end. Advantageously, the tube of flexible material is fixed to the bush. This helps the rod support and maintain the shape of the tube of flexible material. Advantageously, the bush has a circumferential recess, and the flexible material is fixed to the bush by fixing that clamps the flexible material in the recess. Preferably, the fixing is an elasticated ring. Alternatively, the fixing may be a rubber band, O-ring, cable tie or any other suitable fixing.

In accordance with a second aspect of the invention there is provided a dock levelling system comprising a movable hinged ramp arranged within a recess, wherein there is a horizontal gap between the hinged end of the movable ramp and a wall of the recess, the dock levelling system further comprising a seal as described above, wherein the seal is arranged in the horizontal gap with the tube of the seal in contact with the hinged end of the movable ramp and the wall of the recess.

In accordance with a third aspect of the invention there is provided a method of sealing a gap in a dock levelling system using a seal as described above, wherein the dock levelling system comprises a movable hinged ramp arranged within a recess, and wherein there is a horizontal gap between the hinged end of the movable ramp and a wall of the recess, the method comprising the step of inserting the seal into the horizontal gap so that the tube of the seal is in contact with the hinged end of the movable ramp and the wall of the recess.

Preferably, the method further comprises the step of, prior to inserting the seal into the horizontal gap, assembling the seal by inserting the rod into the interior of the tube of flexible material.

Preferably, the method further comprises the step of, prior to inserting the seal into the horizontal gap, cutting the rod to a length that allows the seal to fit within the horizontal gap. It will be appreciated that other assembly steps can be done prior to inserting the seal, including connecting rod sections together using connectors, fixing bushes to the ends of rod sections, fixing the ends of the tube of flexible material of tube to the bushes, and the like.

In accordance with a fourth aspect of the invention there is provided a kit of parts for assembly into a seal for a leveler as described above, comprising a rod and a tube of flexible material.

Preferably, the rod comprises a plurality of rod sections and connector. This allows the parts of the kit to be shorter in length than the assembled seal, making storage, transportation and the like of the kit easier.

Preferably, the kit further comprises two bushes and two elasticated rings.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

A seal for a dock levelling system in accordance with a first embodiment of the invention is now described with reference to FIGS. 4 to 11.

Figure 1:
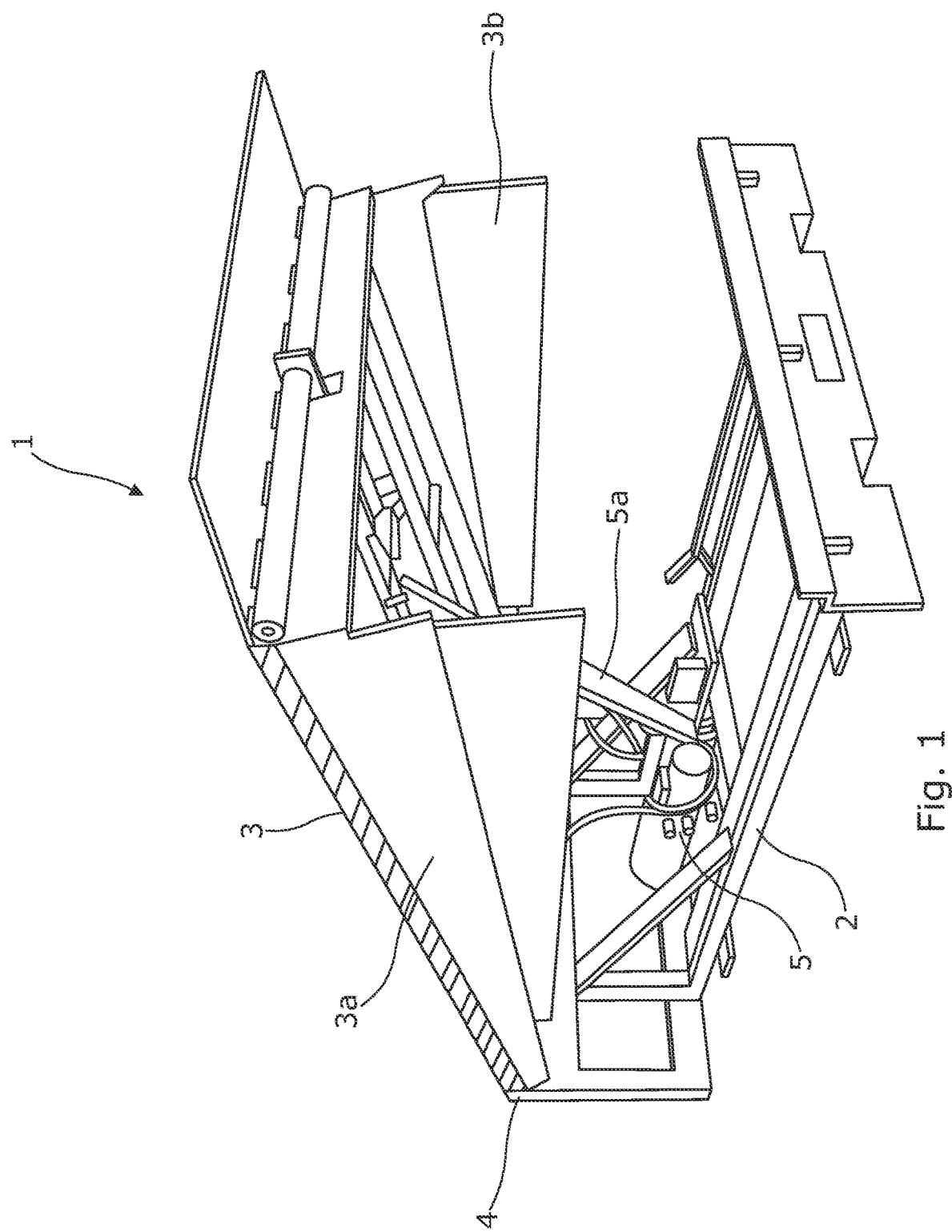
FIG. 1 shows a leveler of a known dock levelling system.
Figure 2:
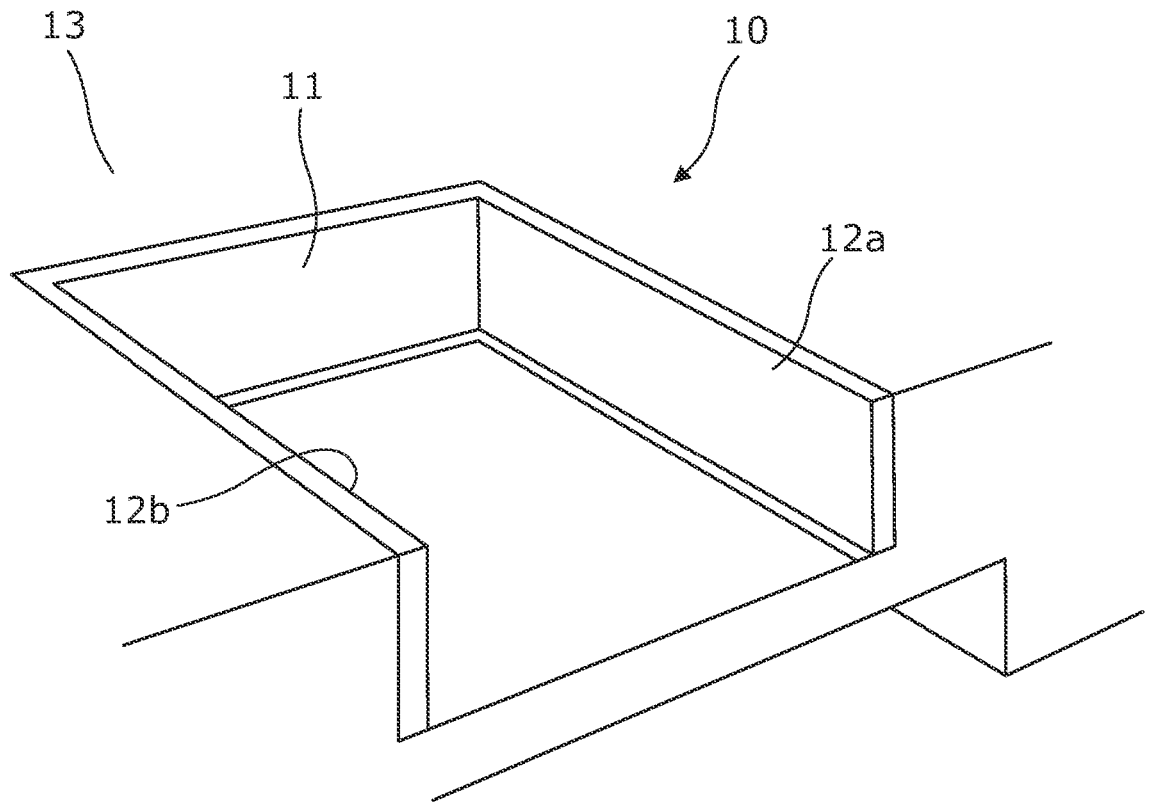
FIG. 2 shows a recess of a known dock levelling system.
Figure 3:
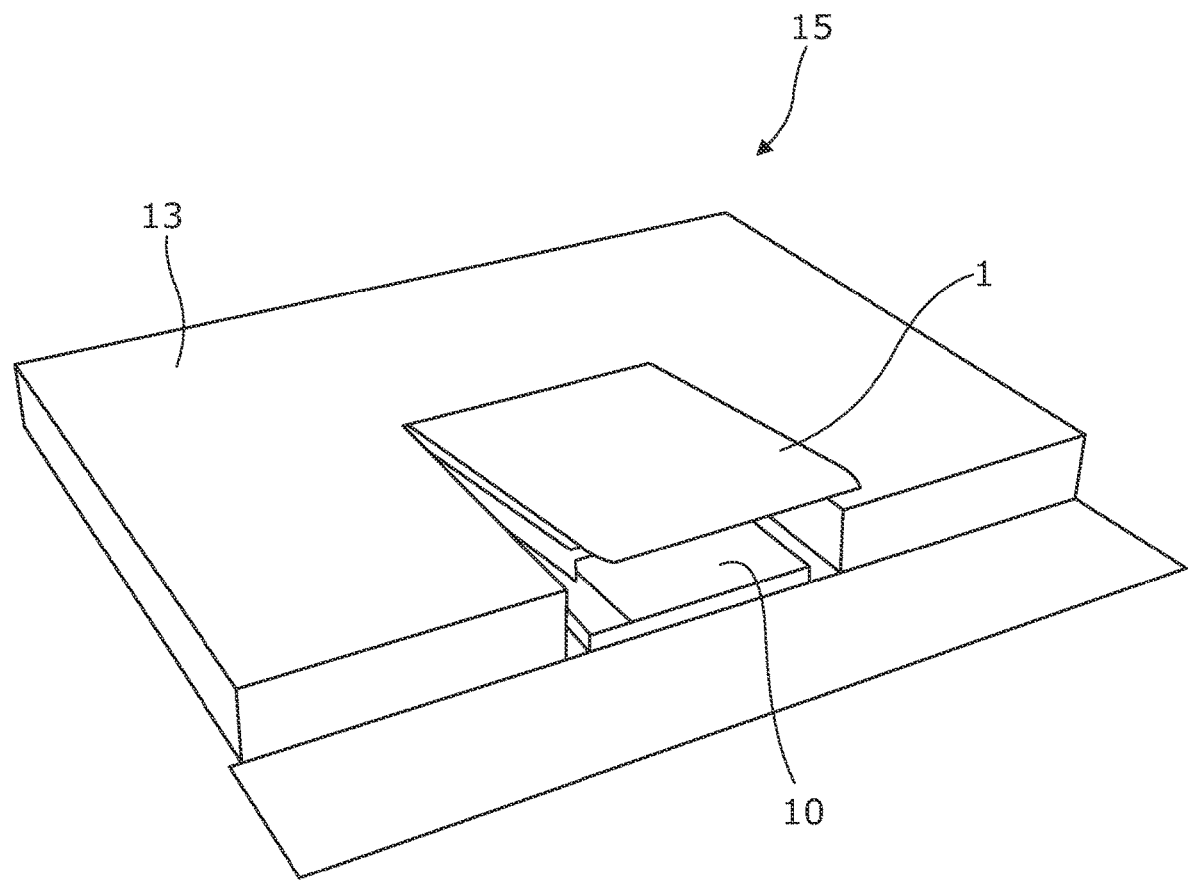
FIG. 3 shows the leveler of FIG. 1 mounted in the recess of FIG. 2.
Figure 4:
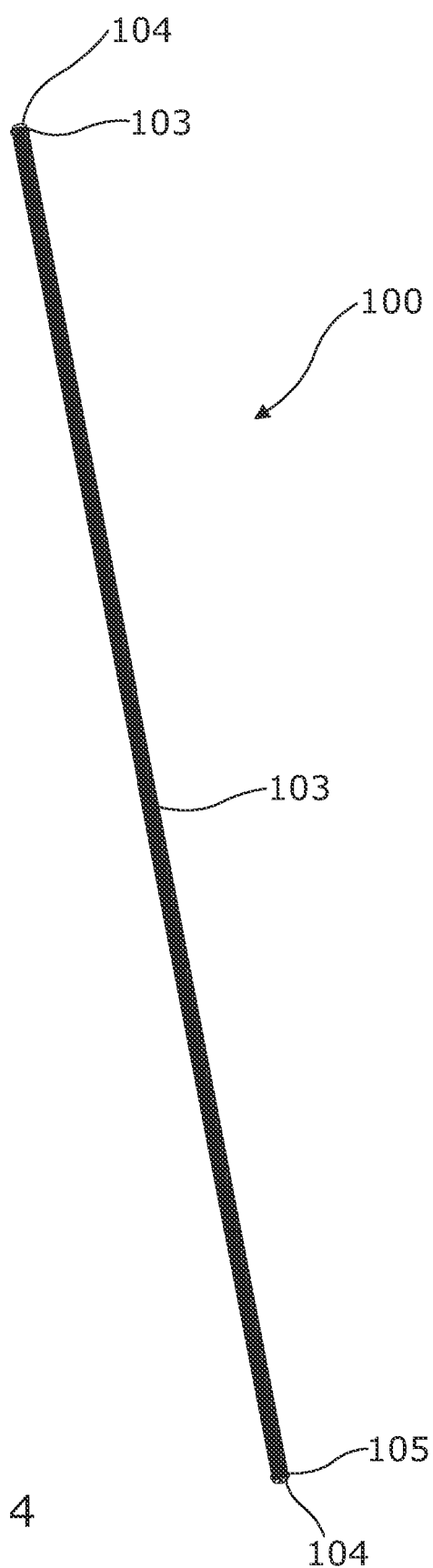
FIG. 4 shows a seal in accordance with a first embodiment of the invention.

FIG. 4 shows the seal 100 of the first embodiment, which comprises a flexible tube 103 of metal wire mesh. At each end of the flexible tube 103 is a bush 104, onto which the flexible tube 103 is held by an O-ring 105, as described in more detail below.

Figure 5:
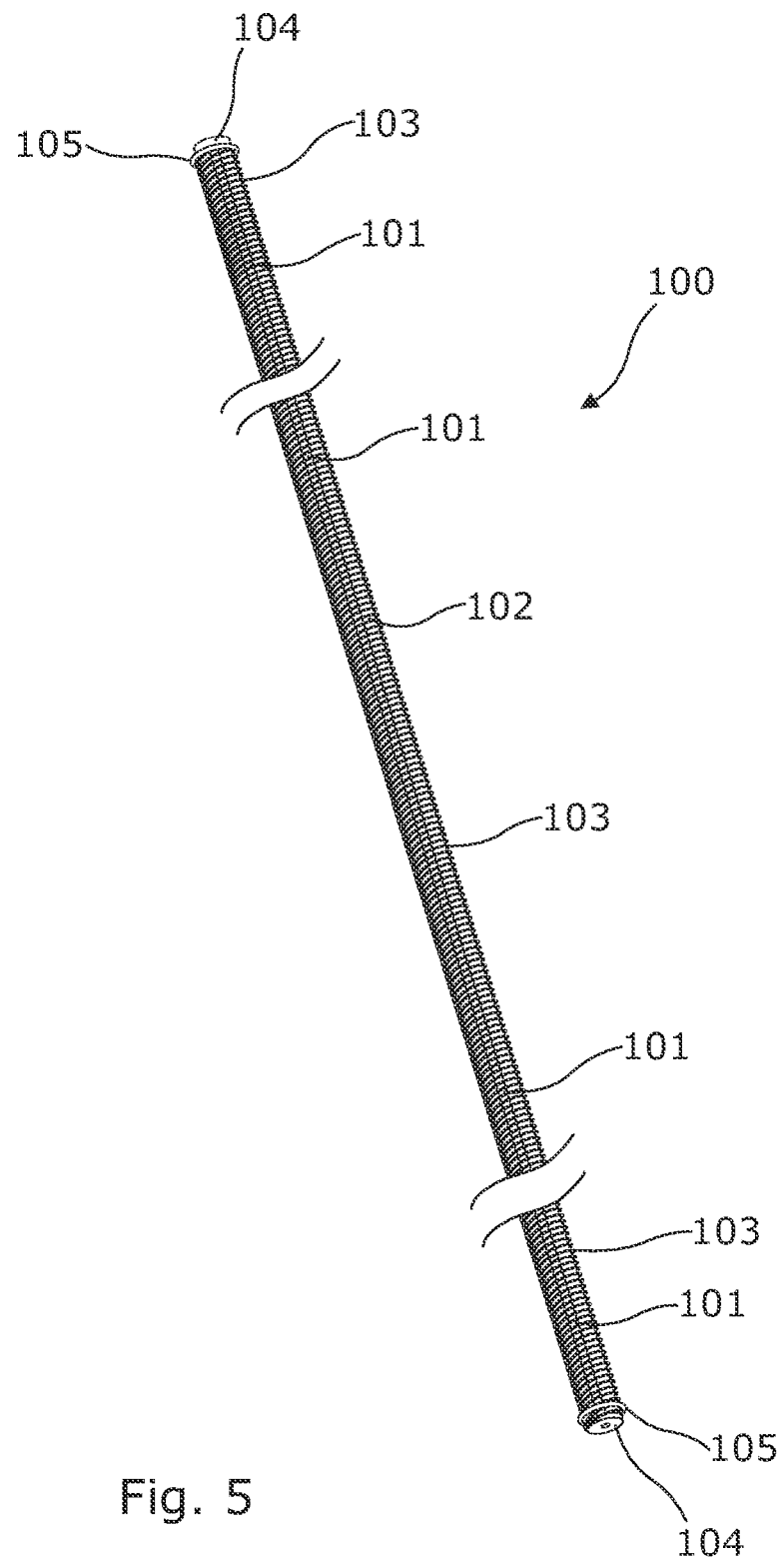
FIG. 5 shows close-up views of the ends and middle of the seal of the first embodiment.
Figure 6A:
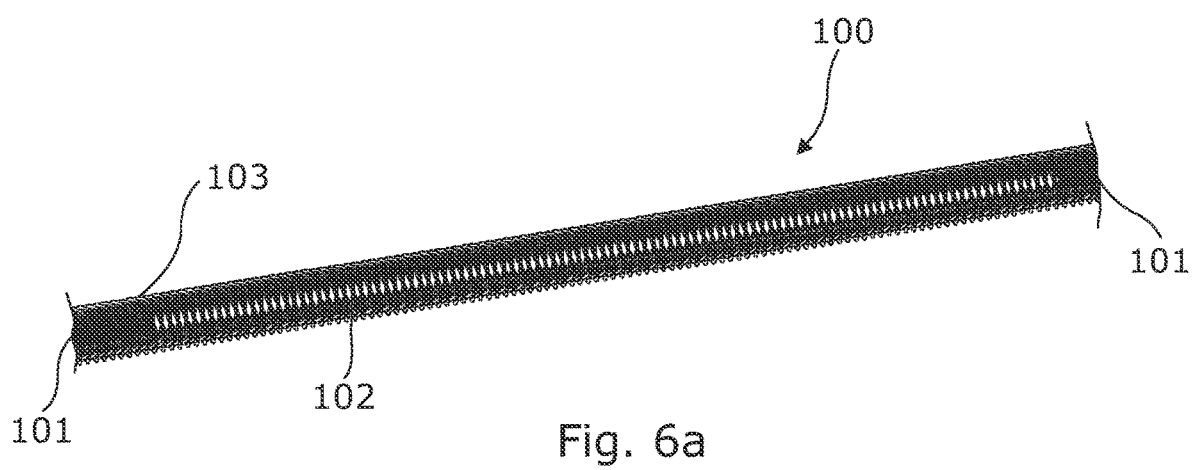
FIG. 6a is a close-up view of the middle of the seal of the first embodiment.
Figure 6B:
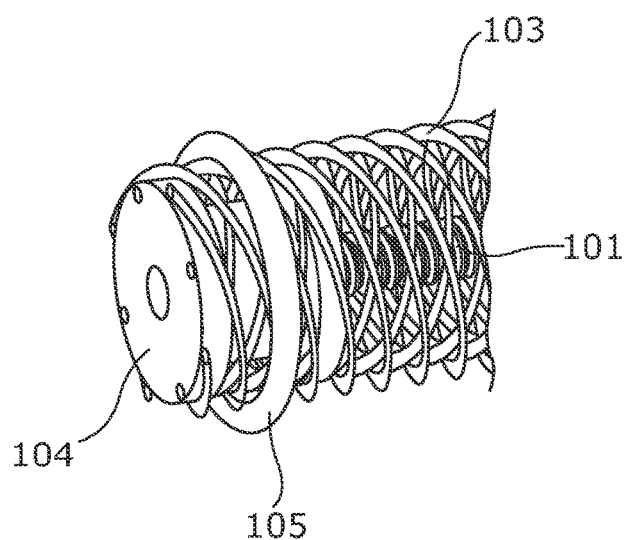
FIG. 6b is a close-up view of an end of the seal of the first embodiment.

FIGS. 5, 6a and 6b show the ends and middle of the seal 100 in more detail. As can be seen, inside the flexible tube 103 are two rod sections 101, which are connected to together at the longitudinal middle of the flexible tube 103 by a connector 102. The outsides of the rod sections 101 are threaded, and screw into threaded holes in the connector 102 to form a single rod running the length of the interior of the flexible tube 103. The rod sections 101 and connector 102 are made of a metal such as stainless steel, and so resilient to bending compression and the like. However, it will be appreciated that in other embodiments of the invention other materials could be used. It will also be appreciated that in other embodiments a single rod section and no connector could be used, or more than two rod sections and corresponding connectors could be used.

The bushes 104 at each end of the seal 100 are fixed to the ends of the rod sections 101, by threaded holes in the bushes 104 into which the rod sections 101 are screwed. The bushes 104 have a central recess running round their perimeter, into which the respective ends of the flexible tube 103 are held by the O-rings 105.

In this way, the seal 100 is a length of flexible tube 103 of metal wire mesh, but given resilient shape and form by the support of the rod comprises of the rod sections 101 running inside it, and held in place by the bushes 104 and O-rings 105.

It will be appreciated that in other embodiments of the invention, the flexible tube 103 could be attached to the ends of the rod sections 101 by other suitable fixings, or not at all; or differently shaped bushes could be used, or the flexible tube 103 could be attached to the bushes 104 or bushes of a different shape by fixings other than O-rings, for example elastic bands, cable ties or something else.

Figure 7:
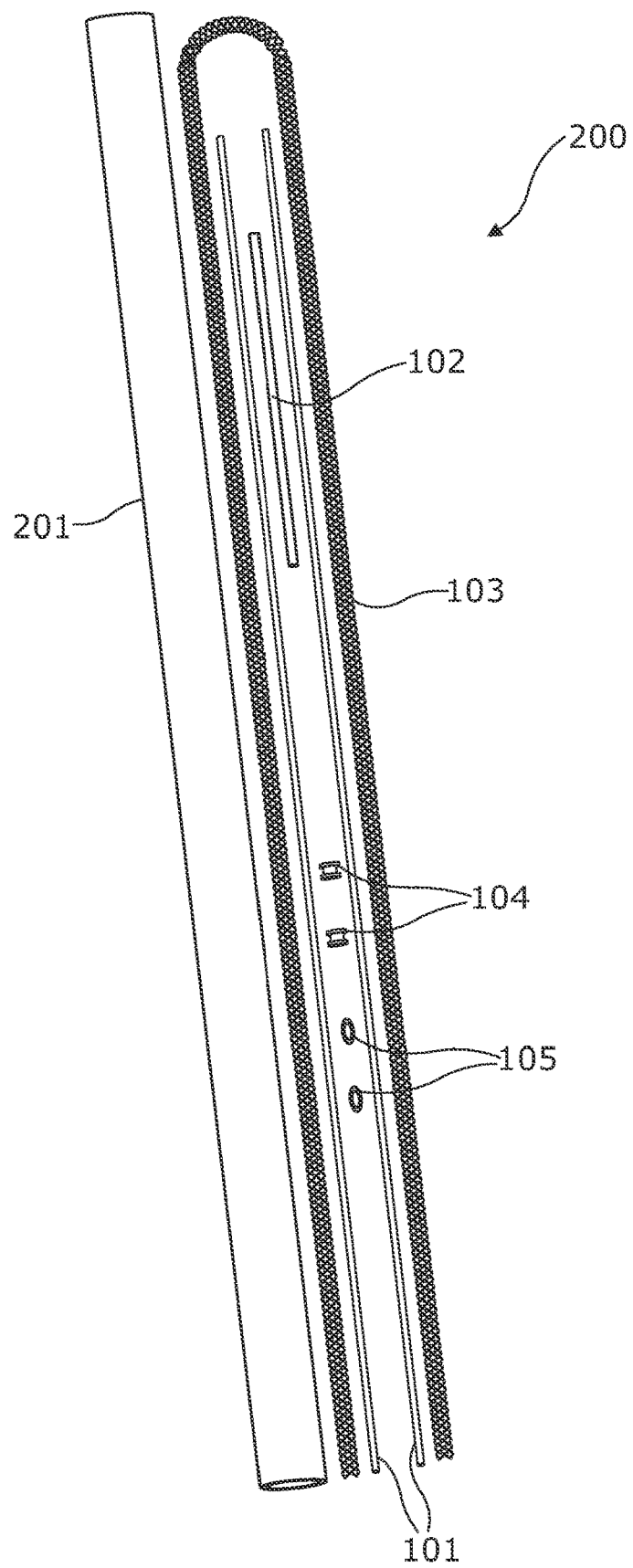
FIG. 7 shows a kit of parts for the seal of the first embodiment.

FIG. 7 shows a kit of parts 200 for the seal 100 of the first embodiment. As can be seen, the kit comprises the two rod sections 101, connector 102, flexible tube 103, bushes 104 and O-rings 105. The kit of parts can be stored, transported or the like within a packing tube 110.

In order to construct the seal 100 from the kit 200, a user will first, if necessary cut one or both of the rod sections 101 to the required length. The rod sections are then connected by the connector 102, and inserted into the inside of the flexible tube 103. (Inserted of a first rod section 101 into the flexible tube 103 may begin before or after the connector 102 and second rod section 101 are connection to the first rod section 101.) At each end, a bush 104 is fixed to the end of the rod section 101, and the flexible tube 103 attached to the outside of the bush 104 by one of the O-rings 105. If required excess material of the flexible tube 103 beyond the bush 104 is removed, preferably after an O-ring 105 has been attached.

Figure 8:
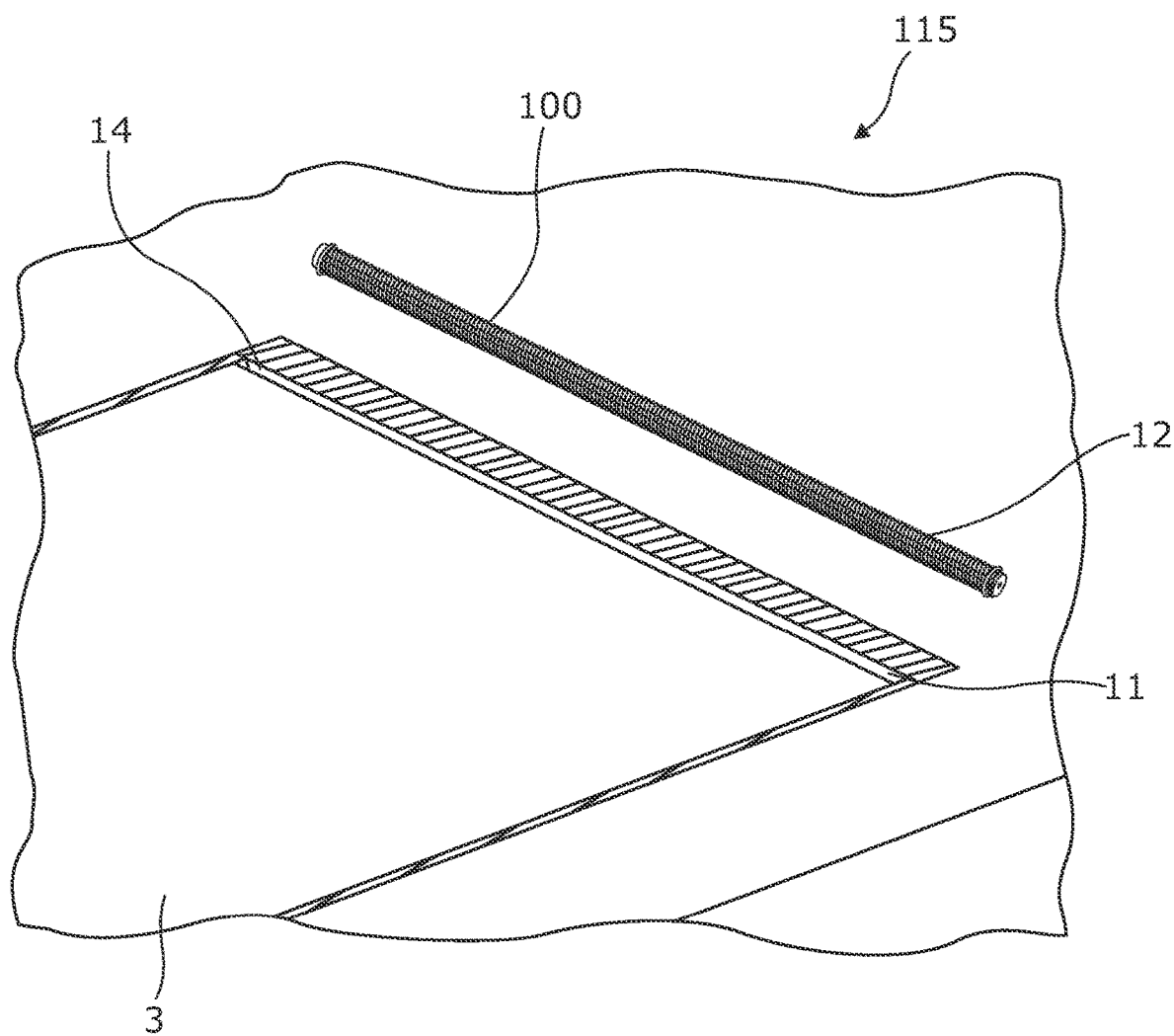
FIG. 8 shows the seal of the first embodiment for installation in a leveler.
Figure 9:
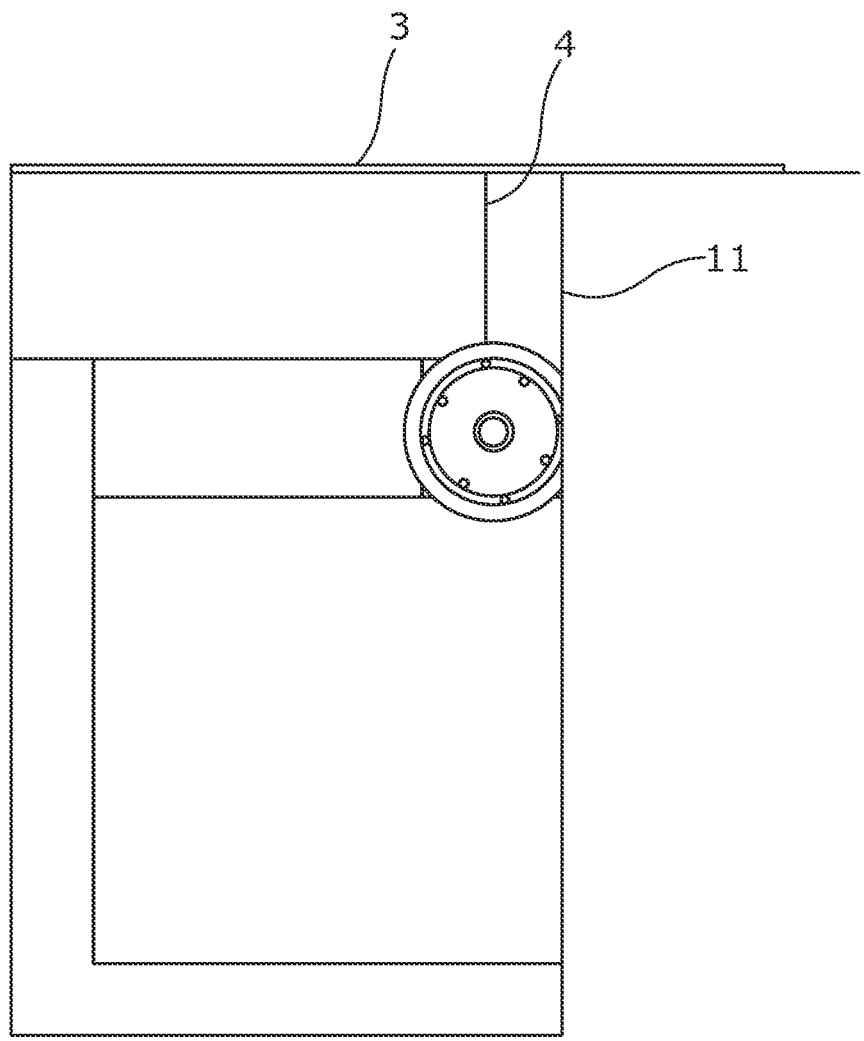
FIG. 9 is a side view of the seal of the first embodiment installed in a leveler.
Figure 10:
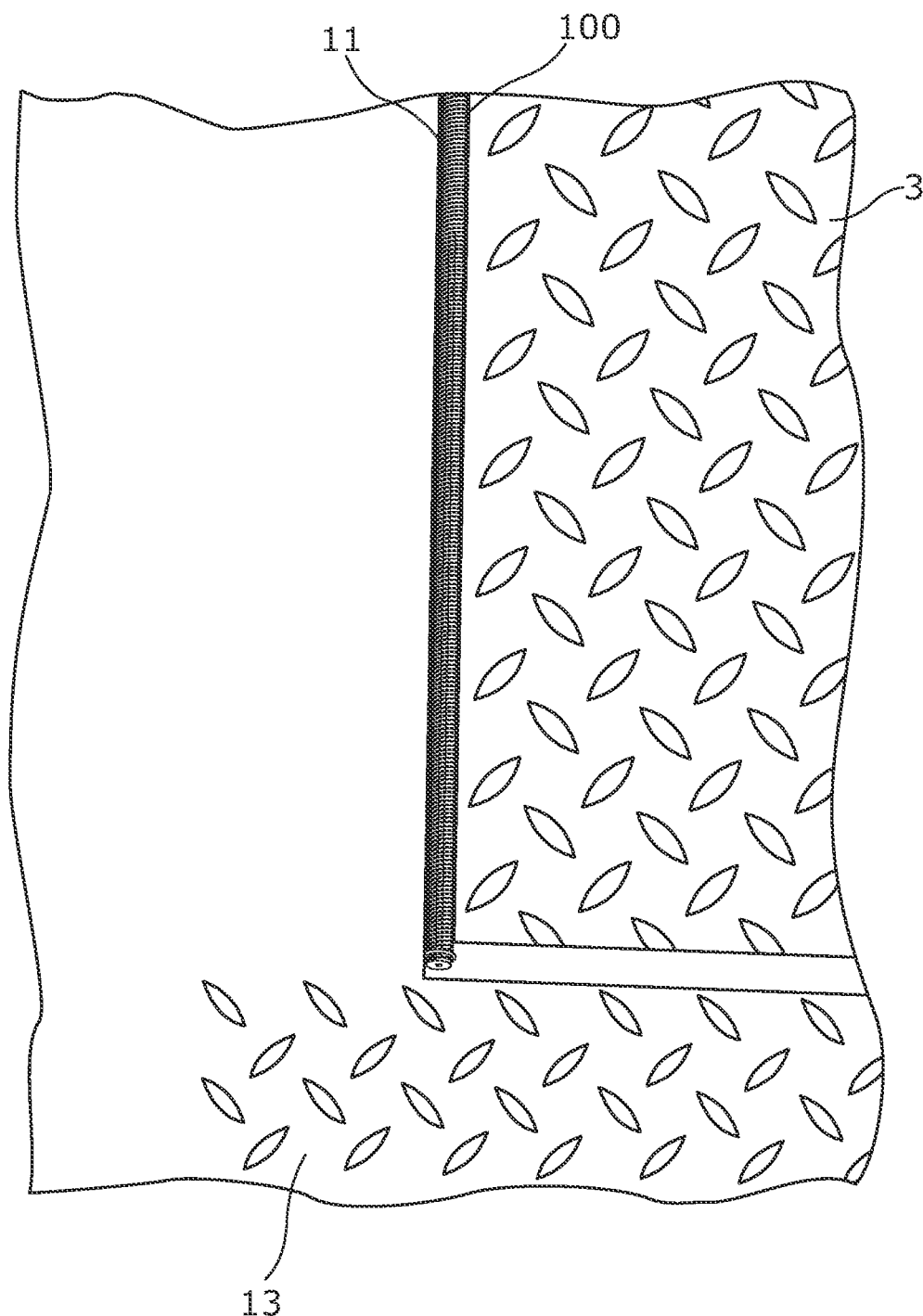
FIG. 10 is a photograph of the seal of the first embodiment installed in a leveler.

FIGS. 8 to 10 show the seal 100 when being installed in the leveler 1. As can be seen from FIG. 8 in particular, the seal 100 matches in length the gap between the rear 4 of the leveler 1 and the rear wall 11 of the recess 10 that it is to fill. To install the seal 100 in position, it is simply pushed into the gap. As can be seen from FIGS. 9 and 10, in position the seal 100 fits in the gap, with material of the flexible tube 103 pushing against both the rear 4 of the leveler 1 and the wall 11, so that the seal 100 is held in place by friction against those surfaces. Further, the rod sections 101 inside the flexible tube 103 ensure the seal 100 maintain its shape when being pushed into position, in particular so that it spans the whole length of the gap The rod sections 101 also help the flexible tube 103 have adequate force against the surfaces of the rear 4 of the leveler 1 and the wall 11, so that there is sufficient friction to hold the seal 100 in position.

While the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A seal for a dock levelling system comprising a movable hinged ramp arranged within a recess, wherein the seal is for sealing a horizontal gap between the hinged end of the movable ramp and a wall of the recess, the seal comprising:
   a rod;
   a tube of flexible material surrounding the rod.

2. The seal according to claim 1, wherein the flexible material of the tube is a metal wire mesh.

3. The seal according to claim 1, wherein the rod comprises a plurality of rod sections connected by connectors.

4. The seal according to claim 3, wherein the outside surfaces of the rod sections comprise a thread, and are arranged to screw into threaded recesses in the connectors.

5. The seal according to claim 1, further comprising a bush on at least one end of the rod.

6. The seal according to claim 5, wherein the tube of flexible material is fixed to the bush.

7. The seal according to claim 6, wherein the bush has a circumferential recess, and the flexible material is fixed to the bush by a fixing that clamps the flexible material in the recess.

8. The seal according to claim 7, wherein the fixing is an elasticated ring.

9. A dock levelling system comprising a movable hinged ramp arranged within a recess, wherein there is a horizontal gap between the hinged end of the movable ramp and a wall of the recess, the dock levelling system further comprising the seal according to claim 1, wherein the seal is arranged in the horizontal gap with the tube of the seal in contact with the hinged end of the movable ramp and the wall of the recess.

10. A method of sealing a gap in a dock levelling system using the seal according to claim 1, wherein the dock levelling system comprises a movable hinged ramp arranged within a recess, and wherein there is a horizontal gap between the hinged end of the movable ramp and a wall of the recess, the method comprising the step of inserting the seal into the horizontal gap so that the tube of the seal is in contact with the hinged end of the movable ramp and the wall of the recess.

11. The method according to claim 10, further comprising a step of, prior to inserting the seal into the horizontal gap, assembling the seal by inserting the rod into the interior of the tube of flexible material.

12. The method according to claim 10, further comprising a step of, prior to inserting the seal into the horizontal gap, cutting the rod to a length that allows the seal to fit within the horizontal gap.

13. A kit of parts for assembly into the seal for a leveler according to claim 1, comprising a rod and a tube of flexible material.

14. The kit according to claim 13, wherein the rod comprises a plurality of rod sections and connector.

15. The kit according to claim 13, further comprising two bushes and two elasticated rings.

* * * * *